(12) United States Patent
Ramirez Llanos et al.

(10) Patent No.: US 12,344,306 B2
(45) Date of Patent: Jul. 1, 2025

(54) VEHICLE TRAILER ANGLE ESTIMATION VIA PROJECTIVE GEOMETRY

(71) Applicant: Continental Autonomous Mobility US, LLC, Auburn Hills, MI (US)

(72) Inventors: Eduardo Jose Ramirez Llanos, Rochester, MI (US); Julien Ip, Royal Oak, MI (US); Dominik Froehlich, Ferndale, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 215 days.

(21) Appl. No.: 18/007,374

(22) PCT Filed: Jul. 29, 2021

(86) PCT No.: PCT/US2021/071049
§ 371 (c)(1),
(2) Date: Jan. 30, 2023

(87) PCT Pub. No.: WO2022/027059
PCT Pub. Date: Feb. 3, 2022

(65) Prior Publication Data
US 2023/0294767 A1 Sep. 21, 2023

Related U.S. Application Data

(60) Provisional application No. 63/058,250, filed on Jul. 29, 2020.

(51) Int. Cl.
*B62D 13/06* (2006.01)
*B60R 1/00* (2022.01)

(52) U.S. Cl.
CPC .............. *B62D 13/06* (2013.01); *B60R 1/003* (2013.01)

(58) Field of Classification Search
CPC ................................ B62D 13/06; B60R 1/003
See application file for complete search history.

(56) References Cited

U.S. PATENT DOCUMENTS

2016/0098604 A1 4/2016 Min
2016/0264046 A1 9/2016 Bochenek et al.
(Continued)

FOREIGN PATENT DOCUMENTS

DE 102018114730 A1 12/2018
JP 2002012172 A 1/2002
(Continued)

OTHER PUBLICATIONS

The International Search Report and the Written Opinion of the International Searching Authority mailed on Nov. 19, 2021 for the counterpart PCT Application No. PCT/US2021/071049.
(Continued)

*Primary Examiner* — George C Jin

(57) ABSTRACT

A method for determining a trailer angle between a tow vehicle and a trailer attached to the tow vehicle includes receiving images from a camera positioned on a rear portion of the tow vehicle with a data processing hardware device, determining visual features from the images, tracking the visual features while the tow vehicle and trailer are moving and calculating, at the data processing hardware, the trailer angle based on the visual features. The trailer angle is then transmitted from the data processing hardware to one or more vehicle systems.

21 Claims, 4 Drawing Sheets

(56) References Cited

U.S. PATENT DOCUMENTS

| | | | |
|---|---|---|---|
| 2018/0001928 A1* | 1/2018 | Lavoie | B62D 15/021 |
| 2018/0121742 A1* | 5/2018 | Son | B62D 15/021 |
| 2019/0016264 A1* | 1/2019 | Potnis | G06N 3/08 |
| 2019/0084477 A1 | 3/2019 | Gomez-Mendoza | |
| 2020/0148256 A1* | 5/2020 | Brimmer | B62D 15/025 |
| 2020/0215992 A1 | 7/2020 | Plowman | |
| 2020/0334475 A1* | 10/2020 | Joseph | B62D 15/027 |
| 2021/0072364 A1 | 4/2021 | Weinlich et al. | |
| 2022/0332250 A1* | 10/2022 | Penaloza | G05D 1/0088 |

FOREIGN PATENT DOCUMENTS

| | | |
|---|---|---|
| JP | 2002068032 A | 3/2002 |
| JP | 2002120775 A | 4/2002 |
| JP | 2003148938 A | 5/2003 |
| JP | 2017502867 A | 1/2017 |
| JP | 2019199150 A | 11/2019 |
| JP | 2020113268 A | 7/2020 |
| JP | 2021525367 A | 9/2021 |
| WO | 2006042665 A1 | 4/2006 |
| WO | 2019197140 A1 | 10/2019 |

OTHER PUBLICATIONS

Christopher de Saxe et al., "A visual template-matching method for articulation angle measurement," IEEE 18th International Conference on Intelligent Transportation Systems, Sep. 15-18, 2015.

Notice of Reasons for Refusal drafted Dec. 11, 2023 for the counterpart Japanese Patent Application No. 2023-505931 and machine translation of same.

Notice of Refusal dated Sep. 6, 2024 for the counterpart Japanese Patent Application No. 2023-505931 and machine translation of same.

Notice of Allowance dated Dec. 6, 2024 for the counterpart Japanese Patent Application No. 2023-505931 and machine translation of same.

* cited by examiner

VEHICLE TRAILER ANGLE ESTIMATION VIA PROJECTIVE GEOMETRY

CROSS REFERENCE TO RELATED APPLICATION

The present application is a National Stage Application under 35 U.S.C. § 371 of International Patent Application PCT/US2021/071049 filed on Jul. 29, 2021 which claims priority from U.S. Provisional Application No. 63/058,250 filed Jul. 29, 2020, which applications are incorporated by reference herein.

TECHNICAL FIELD

This disclosure relates to a system and method for vehicle trailer angle estimation via projective geometry.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the powered vehicle's lights.

Some of the challenges that face tow vehicle drivers is performing tow vehicle maneuvers while the trailer is attached to the tow vehicle. In some examples, more than one person may be needed to maneuver the tow vehicle towards the specific location. Since the vehicle-trailer unit swivels around the hitch horizontally allowing the vehicle-trailer unit to move around corners, when the vehicle moves, it pushed/pulls the trailer. Drivers are often confused as to which way to turn the vehicle steering wheel to get the desired change of direction of the trailer when backing up, for example. Applying an incorrect steering angle in the vehicle may also cause the trailer to jack-knife and lose its course. Vehicle equipment manufacturers continually seek to improve operation while reducing costs and hardware requirements.

The background description provided herein is for the purpose of generally presenting a context of this disclosure. Work of the presently named inventors,to the extent it is described in this background section, as well as aspects of the description that may not otherwise qualify as prior art at the time of filing, are neither expressly nor impliedly admitted as prior art against the present disclosure.

SUMMARY

A method for determining a trailer angle between a tow vehicle and a trailer attached to the tow vehicle according to one disclosed embodiment includes, among other possible things, receiving, at a data processing hardware, images from a camera positioned on a rear portion of the tow vehicle, determining, at the data processing hardware, visual features from the images, tracking, at the data processing hardware, the visual features while the tow vehicle and trailer are moving, calculating, at the data processing hardware, the trailer angle based on the visual features and transmitting, from the data processing hardware to one or more vehicle systems in communication with the data processing hardware, the trailer angle.

Another embodiment of the foregoing method, further comprising determining a zero angle while the tow vehicle and trailer are moving straight.

Another embodiment of any of the foregoing methods, further comprising determining, at the data processing hardware, that the tow vehicle and trailer are moving straight based on information indicative of tow vehicle operation.

In another embodiment of any of the foregoing methods, determining the visual features from the images further comprises selecting features from the images that are substantially in a common plane.

Another embodiment of any of the foregoing methods, further comprises determining the visual features from the images further comprises selecting a common plane that have a predefined number of feature matches.

Another embodiment of any of the foregoing methods, further comprises determining the visual features further comprises grouping visual features according to a spacial location in the image and selecting one group of visual features based on a calculated probability that the grouping is within a common plane.

Another embodiment of any of the foregoing methods, further comprises calculating the trailer angle based on the visual features further comprises performing a projective transformation, at the data processing hardware, between the images of the visual features.

Another embodiment of any of the foregoing methods, wherein the projective transformation calculation comprises a linear transformation between the selected visual features from one set of images at a first orientation of the camera relative to the trailer and a second set of images at a second orientation of the camera relative to the trailer.

Another embodiment of any of the foregoing methods, wherein the projective transformation includes extracting a rotation matrix for each common plane.

Another embodiment of any of the foregoing methods further comprises extrapolating the relative rotation of the trailer relative to the tow vehicle to a rotation corresponding with a hitch point between the tow vehicle and the trailer.

A system for determining a trailer angle between a tow vehicle and a trailer attached to the vehicle according to another disclosed embodiment includes, among other things, a data processing hardware device configured to receive images from a camera positioned on a rear portion of the tow vehicle, determine visual features from the images, track the visual features while the tow vehicle and trailer is moving, calculate the trailer angle based on the visual features, and transmit to one or more vehicle systems in communication with the data processing hardware, the trailer angle.

In another disclosed embodiment of the foregoing system for determining a trailer angle the data processing hardware device is configured to determine a zero angle between the tow vehicle and the trailer while the tow vehicle and trailer are moving straight.

In another disclosed embodiment of any of the foregoing systems for determining a trailer angle, the data processing hardware device is configured to receive information from sensors gathering information on operation of the two vehicle and determine that the tow vehicle and trailer are at the zero angle, at least partially, based on the sensors providing information indicated that the tow vehicle is moving straight.

In another disclosed embodiment of any of the foregoing systems for determining a trailer angle, the data processing hardware device is configured to select visual features from the images that are disposed within a substantially common plane.

In another disclosed embodiment of any of the foregoing systems for determining a trailer angle, the data processing hardware is configured to perform a projective transformation calculation on a first image including the selected visual features and on a second image of the selected visual features at a different location and calculating an angle between the tow vehicle and the trailer based on an angle between the projective transformation calculation of the first image and the second image.

In another disclosed embodiment of any of the foregoing systems for determining a trailer angle, the projective transformation calculation includes extracting a rotation matrix for each common plane.

Another disclosed embodiment of any of the foregoing systems for determining a trailer angle further comprises a camera mounted to an aft structure of the tow vehicle.

Another disclosed embodiment of any of the foregoing systems for determining a trailer angle, further comprises at least one sensor disposed within the tow vehicle communicating information indicative of an orientation of the tow vehicle to the data processing hardware.

A non-transitory computer readable medium including instructions executable by a data processing hardware according to another example disclosed embodiment includes, among other possible things, instructions executed by the data processing hardware for receiving images of a trailer from a camera positioned on a rear portion of a tow vehicle, instructions executed by the data processing hardware for determining visual features from the images, instructions executed by the data processing hardware for tracking the visual features while the tow vehicle and trailer is moving, instructions executed by the data processing hardware for calculating the trailer angle based on the visual features and instructions executed by the data processing hardware for transmitting to one or more vehicle systems in communication with the data processing hardware, the trailer angle.

Another disclosed embodiment of the foregoing non-transitory computer readable medium, further comprises instructions executed by the data processing hardware for performing a projective transformation calculation including a linear transformation between selected visual features from one set of images at a first orientation of the camera relative to the trailer and a second set of images at a second orientation of the camera relative to the trailer.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DESCRIPTION OF DRAWINGS

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a vehicle coupler attached to a trailer hitch, e.g., a vehicle tow ball attached to a trailer hitch coupler. Vehicles that include trailer reverse and driving systems detect and utilize an angle between the tow vehicle and the trailer for operation.

Figure 1A:
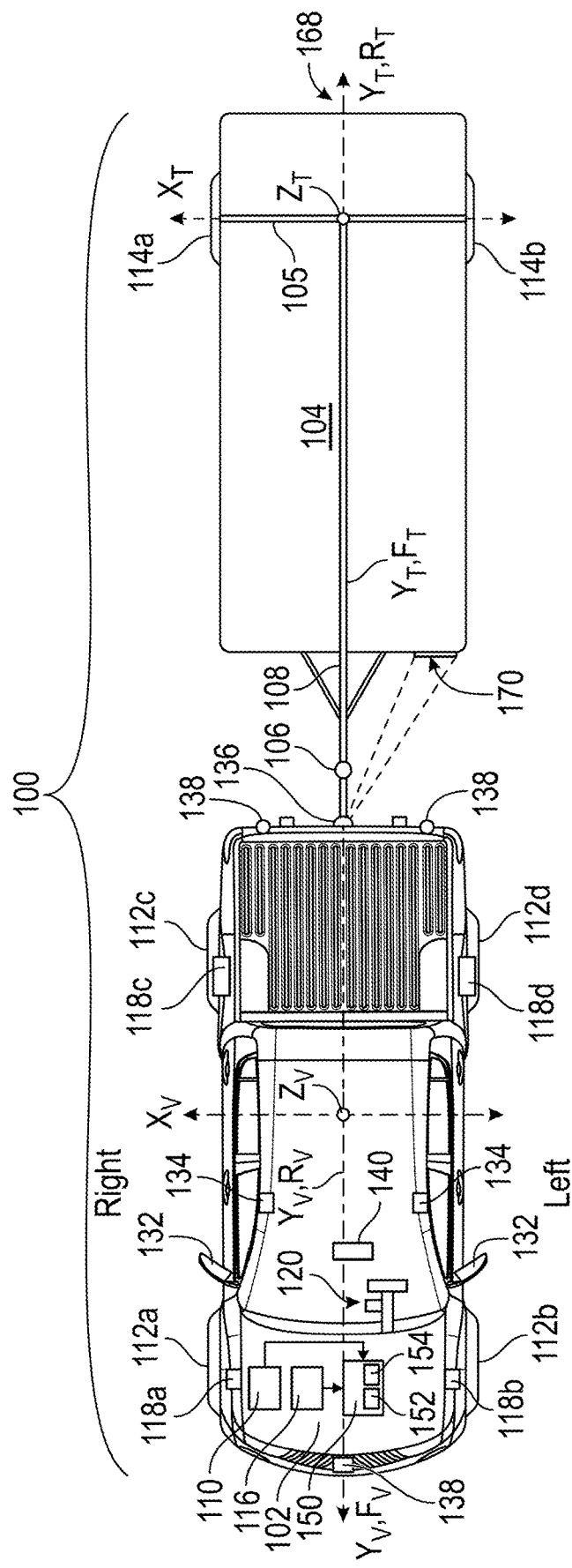
FIG. 1A is a schematic view of an exemplary tow vehicle hitched to a trailer.
Figure 1B:
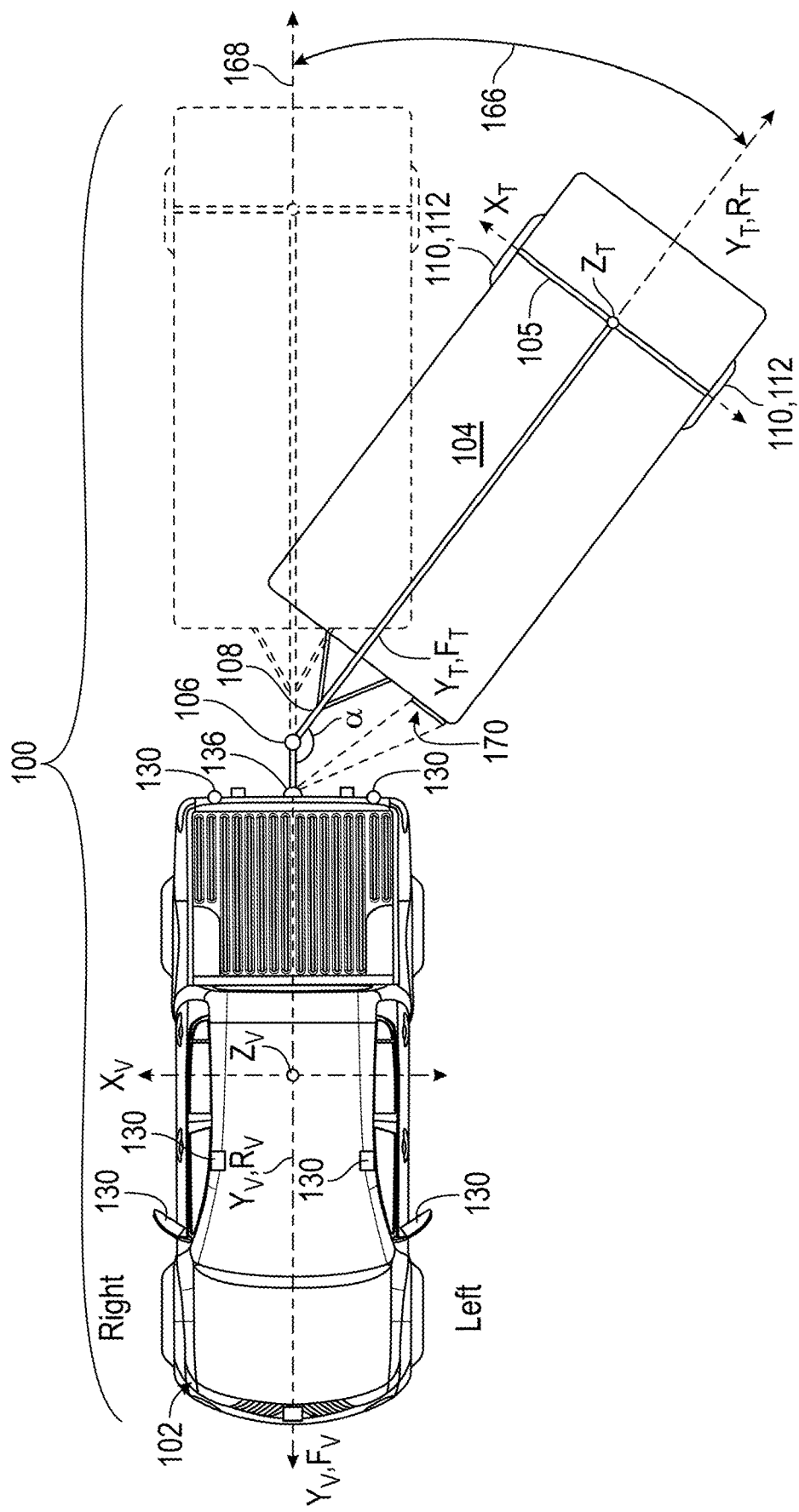
FIG. 1B is a schematic view of an exemplary tow vehicle hitched to a trailer at an angle.
Figure 2:
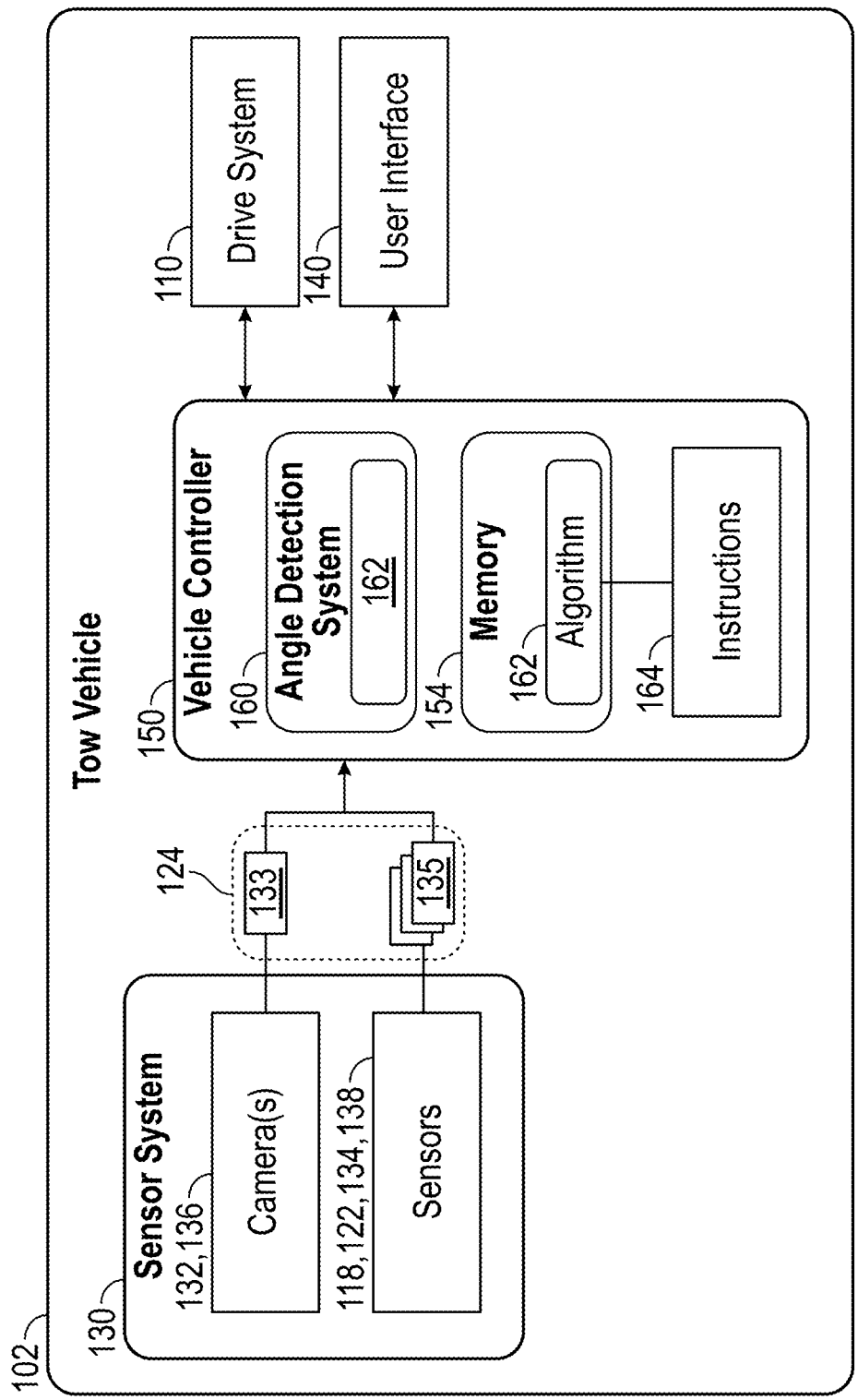
FIG. 2 is a schematic view of the exemplary tow vehicle having an angle detection system.

Referring to FIGS. 1A, 1B and 2, in some implementations, a vehicle-trailer system 100 includes a tow vehicle 102 hitched to a trailer 104. The tow vehicle 102 includes a vehicle tow ball attached to a trailer hitch coupler 106 supported by a trailer hitch bar 108 of the trailer 104. The tow vehicle 102 includes a drive system 110 associated with the tow vehicle 102 that maneuvers the tow vehicle 102 and thus the vehicle-trailer system 100 across a road surface based on drive maneuvers or commands having x, y, and z components, for example.

The tow vehicle 102 includes a front right wheel 112a, a front left wheel 112b, a rear right wheel 112c, and a rear left wheel 112d. In addition, the drive system 110 may account for wheels 114a and 114b associated with the trailer 104. The drive system 110 may include other wheel configurations as well. The drive system 110 may include a motor or an engine that converts one form of energy into mechanical energy allowing the vehicle 102 to move. The drive system 110 includes other components (not shown) that are in communication with and connected to the wheels 112a-d and engine and that allow the vehicle 102 to move, thus moving the trailer 104 as well. The drive system 110 may also include a brake system (not shown) that includes brakes associated with each wheel 112a-d, where each brake is associated with a wheel 112a-d and is configured to slow down or stop the wheel 112a-d from rotating. In some examples, the brake system is connected to one or more brakes supported by the trailer 104. The drive system 110 may also include an acceleration system (not shown) that is configured to adjust a speed of the tow vehicle 102 and thus the vehicle-trailer system 100, and a steering system that is configured to adjust a direction of the tow vehicle 102 and thus the vehicle-trailer system 100. The vehicle-trailer system 100 may include other systems as well that are generally indicated at 116.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$ extends between a right side R and a left side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion.

In some examples, the tow vehicle 102 includes a suspension system (not shown), which when adjusted causes the tow vehicle 102 to tilt about the $X_V$ axis and or the $Y_V$ axis, or move along the central vertical axis $Z_V$. As the tow vehicle 102 moves, the trailer 104 follows along a path of the tow vehicle 102. Therefore, when the tow vehicle 102 makes a turn as it moves in the forward direction $F_V$, then the trailer 104 follows along. While turning, the tow vehicle 102 and the trailer 104 form a trailer angle 166.

Moreover, the trailer 104 follows the tow vehicle 102 across the road surface by various combinations of movements relative to three mutually perpendicular axes defined by the trailer 104: a trailer transverse axis $X_T$, a trailer fore-aft axis $Y_T$, and a trailer central vertical axis $Z_T$. The trailer transverse axis $X_T$ extends between a right side and a left side of the trailer 104 along a trailer turning axle 105. In some examples, the trailer 104 includes a front axle (not shown) and rear axle 105. In this case, the trailer transverse axis $X_T$ extends between a right side and a left side of the trailer 104 along a midpoint of the front and rear axle (i.e., a virtual turning axle). A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$. Therefore, when the tow vehicle 102 makes a turn as it moves in the forward direction $F_V$, then the trailer 104 follows along. While turning, the tow vehicle 102 and the trailer 104 form the trailer angle 166 (FIG. 1B) being an angle between the vehicle fore-aft axis $Y_V$ and the trailer fore-aft axis $Y_T$.

In some implementations, the vehicle 102 includes a sensor system 130 to provide sensor system data 124 that may be used to determine one or more measurements, such as, a trailer angle 166 (FIG. 2). In some examples, the vehicle 102 may be autonomous or semi-autonomous, therefore, the sensor system 130 provides reliable and robust autonomous driving. The sensor system 130 provides sensor system data 124 and may include different types of sensors 118, 120, 134 and 138 that may be used separately or with one another to create a perception of the tow vehicle's environment or a portion thereof that is used by the vehicle-trailer system 100 to identify object(s) in its environment and/or in some examples autonomously drive and make intelligent decisions based on objects and obstacles detected by the sensor system 130. In some examples, the sensor system 130 includes one or more cameras 136 supported by a rear portion of the tow vehicle 102 which provide sensor system data 133 associated with object(s) positioned behind the tow vehicle 102. The tow vehicle 102 may support the sensor system 130; while in other examples, the sensor system 130 is supported by the vehicle 102 and the trailer 104.

The sensor system 130 includes one or more cameras 132, 136 that provide camera data 133. The one or more cameras 132, 136 may include mono-cameras where each position on an image shows a different amount of light, but not a different hue. In some examples, the camera(s) 132, 136 may include a fisheye lens that includes an ultra-wide-angle lens that produces strong visual distortion intended to create a wide panoramic or hemispherical image 133. Fisheye cameras capture images 133 having an extremely wide angle of view. Other types of cameras may also be used to capture images 133 of the vehicle and trailer environment. The camera data 133 may include additional data 133 such as intrinsic parameters (e.g., focal length, image sensor format, and principal point) and extrinsic parameters (e.g., the coordinate system transformations from 3D world coordinates to 3D camera coordinates, in other words, the extrinsic parameters define the position of the camera center and the heading of the camera in the vehicle's coordinates). In addition, the camera data 133 may include minimum/maximum/average height of the camera 132 with respect to ground (e.g., when the vehicle is loaded and unloaded), and a longitudinal distance between the camera 132 and the tow vehicle hitch ball. In this disclosed example, the cameras 132 are disposed on side view mirrors of the tow vehicle. The camera 136 is disposed on a rear portion of the tow vehicle 102 and provides images of forward facing surfaces of the trailer 104.

The sensor system 130 may include, but is not limited to, radar, sonar, LIDAR (Light Detection and Ranging, which can entail optical remote sensing that measures properties of scattered light to find range and/or other information of a distant target), LADAR (Laser Detection and Ranging), ultrasonic, etc. schematically indicated at 138. The sensor system 130 may further include wheel speed sensors 118a-b disposed at each wheel to provide information indicative of wheel speed at each of the wheels 112a-d. The sensor system 130 may also include a steering sensor 120 that provides information indicative of an orientation of the steering wheels. It should be appreciated that other sensing devices may also be provided as part of the example sensing system 130 and are within the scope and contemplation of this disclosure.

The sensor system 130 provides sensor system data 124 that includes one or both of images 133 from the one or more cameras 132, 136 and sensor information 135 from the one or more other sensors 118, 120, 134, and 138. Therefore, the sensor system 130 is especially useful for receiving information of the environment or portion of the environment of the vehicle and for increasing safety in the vehicle-trailer system 100 which may operate by the driver or under semi-autonomous or autonomous conditions. In some implementations, a first camera 132a and a second camera 132b are positioned on each side of the vehicle 102. Additionally, the rear facing third camera 136 may be mounted at the rear of the vehicle 102.

The tow vehicle 102 may include a user interface 140, such as a display. The user interface 140 is configured to display information to the driver. In some examples, the user interface 140 is configured to receive one or more user commands from the driver via one or more input mechanisms or a touch screen display and/or displays one or more notifications to the driver. In some examples, the user interface 140 is a touch screen display. In other examples, the user interface 140 is not a touchscreen and the driver may use an input device, such as, but not limited to, a rotary knob or a mouse to make a selection. In some examples, a trailer parameter detection system 160 instructs the user interface 140 to display one or more trailer parameters 162.

The user interface 140 is in communication with a vehicle controller 150 that includes a computing device (or data processing hardware) 152 (e.g., central processing unit having one or more computing processors) in communication with non-transitory memory or memory hardware 154 (e.g., a hard disk, flash memory, random-access memory) capable of storing instructions executable on the computing processor(s)). In one example embodiment, the non-transitory memory 154 stores instructions 164 that when executed on the data processing hardware 152 cause the vehicle controller 150 to send a signal to one or more other vehicle systems 110, 116. As shown, the vehicle controller 150 is supported by the tow vehicle 102; however, the vehicle controller 150 may be separate from the tow vehicle 102 and in communication with the tow vehicle 102 via a network (not shown). In addition, the vehicle controller 150 is in communication with the sensor system 130 and receives sensor system data 124 from the sensor system 130. In some examples, the vehicle controller 150 is configured to process sensor system data 124 received from the sensor system 130.

In some implementations, the vehicle controller 150 includes an angle detection system 160 that outputs a trailer angle 166. The angle detection system 160 executes an algorithm 162 that estimates the angle 166 of the trailer 104 attached to the vehicle 102. Using projective geometry, the angle detection system 160 estimates the relative angle of vehicle-trailer system 100. In other words, the angle detection system 160 determines the angle 166 between an attached trailer 104 and the two vehicle 102 using the camera 136. In this example the camera 136 is a mono camera and optionally vehicle information such as vehicle steering wheel angle, wheel ticks, vehicle velocity, gear, and/or IMU information.

The angle detection system 160 utilizes features selected from images provided by the rear camera 136 to determine a relative angle of the trailer 104 to the tow vehicle 102 as compared to a determined zero angle. The disclosed angle detection system 160 works for planar and non-planar trailer surfaces by selecting features on camera facing surfaces. The selected features comprise a plurality of points that are within a common or substantially common plane. Accordingly, the example angle detection system 160 uses selected features and points from real time images rather than based on stored images.

Figure 3:
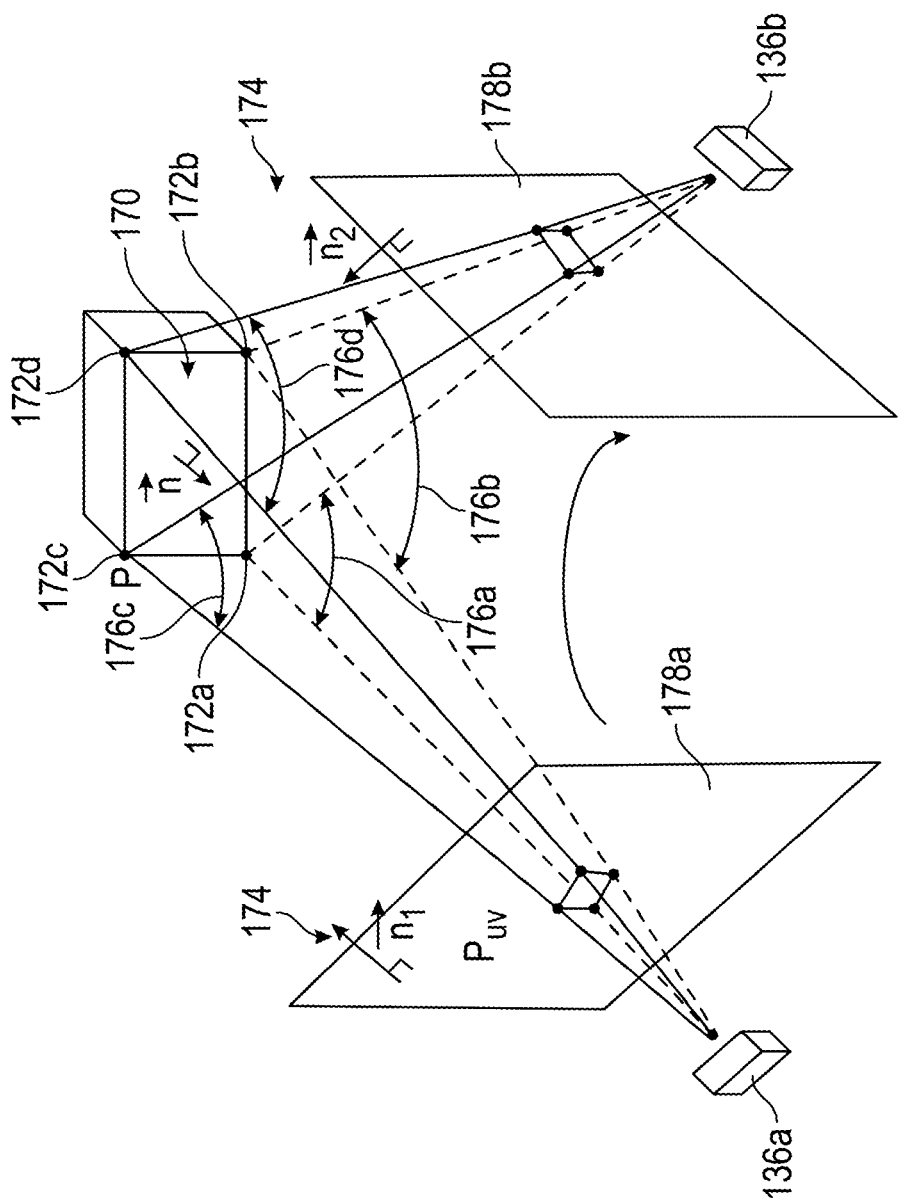
FIG. 3 is an example projective geometry.

Referring to FIG. 3 with continued reference to FIGS. 1A, 1B and 2 the angle detection system 160 executes the algorithm 162 utilizing images 133 from the single camera 136 mounted in the tow vehicle 102 and sensor data 135 such as steering wheel angle, wheel encoders, gear, IMU, etc. received from sensors 118, 120, 134 and 138. FIG. 3 is a schematic representation that illustrates a first position of a camera at 136a and a second position of the camera 136b in relation to the selected portion of the trailer face 170. The camera 136 does not physically move from its location on the tow vehicle 102. Instead, the schematic view shown in FIG. 3 shows a change in the relative orientation of the camera 136 and the portion 170 of the trailer 104 that occurs during a turn or other maneuver.

The example angle detection algorithm 162 outputs an angle in the yaw direction between the tow vehicle 102 and trailer 104. It is also within the contemplation of this disclosure that the angle detection algorithm may provide information indicative of a relative angle in the pitch and roll axis. Information regarding the configuration and specific parameters of the camera 136 such as focal length, image sensor format, and principal point are known.

In operation, the example algorithm 162 is executed by a data processing hardware device such as the example controller 150 to receive images from the camera 136. From those images, visual features 172a-d are selected and generated. FIG. 3 is a schematic representation of the projective geometry utilized to determine the angle 166. In this example, the selected visual features 172a-d are obtained from the images and are within substantially planer portion 170 on the forward facing surface of the trailer 104. The portion 170 need not be centered or in any particular location. The system 160 selects the portion 170 based on the visual features 172a-d being in a best fit plane. The system 160 periodically extracts the visual features from the sequence of images to update the image utilized to determine the angle 166.

Once the features 172a-d are selected a zero angle maneuver is performed to provide a baseline angle from which the angle 166 is determined. The system 160 computes a zero-angle reference axis 168 with information from the tow vehicle sensor system 130. The zero-angle reference axis 168 may be calculated by driving the vehicle-trailer system 100 straight until the system 160 is aligned (in zero-angle). When the system 160 is aligned, e.g., after some time driving straight, the algorithm 162 compute the visual reference features 172a-d. The selection and computing of the visual reference features filters out errant and outlying points that are not consistent with the remaining and eventually selected visual features 172a-d. The tow vehicle 102 is determined to be moving straight based on information 135 from the sensors 118, 120, 134 and 138 as well as any other tow vehicle information that is indicative an confirms straight line movement. In this example, the vehicle information includes information such as steering wheel angle from the steering sensor 120, wheel rotation from the wheel speed sensors 118a-d, vehicle velocity, and acceleration as well as any other available information that can be used to increase the robustness of the zero-angle determination. The zero-angle determination is executed automatically and may be periodically updated to maintain and confirm the zero-angle accuracy.

Once the zero-angle axis 168 has been determined and the visual features 170a-d selected, the system 160 tracks those visual features. Tracking of the visual features includes a periodic analysis of the images captured by the camera. The tracking of the visual features may be performed continually or prompted responsive to an indication that the orientation between the tow vehicle 102 and the trailer 104 is changing. During a turning maneuver the visual features 170a-d are tracked.

Tracking of the visual features 172 a-d is performed automatically and provides for the angle calculations required to determine the trailer angle 166 (FIG. 1B).

Given the initial zero-range determination and the current features, a Nomography matrix is computed using projective geometry. At least 4 of the visual features 172a-d are utilized to complete the Nomography matrix. The homography matrix is 3×3 matrix that relates the transformation between two planes.

The front face of a trailer 104 may or may not be planar. The system 160 generalizes the front of the trailer for locally planar surfaces such as the portion 170. The portion 170 is defined by the visual features 172 a-d in a planar or nearly planar surface.

To obtain features that belong to a locally planar surface, the system computes the Nomography matrix for different subsets of matches among the visible features 172a-d. The Nomography matrices that don't have a sufficient predefined amount of feature matches related to it are not utilized. To determine what features matches are related to a Nomography matrix, the system utilizes methods such as a Least Squares optimization, Random Sample Consensus (RANSAC), Support Vector Machine (SVN), Least-Median robust method, along with other known statistical parameters for verifying applicable features. Filtering the features that are not compatible with the selected Nomography matrices prior the trailer's angle calculation reduces the reprojection error. An optimization method such as gradient descent, Levenberg-Marquardt, or other known method may also be utilized to refine the calculated Nomography matrices.

Once the visual features 172a-d are determined for a Nomography matrix, the Nomography matrix provides four (4) solutions. The two solutions with negative translations are discarded. A rotation matrix is extracted from the remaining positive solutions. The rotation matrix provides a value that represents a spacial rotation between the initial position given by the zero-angle determination and a current position of the trailer 104.

The rotation matrix gives the trailer angle 166 by looking at the system's geometry given by a normal of the plane $\vec{n}$ 174 and the normal of the camera frames 178 a, b. The angle between the two planes 178a and 178b is determined for each of the Nomography matrices found from visual features 172 a-d and a solution is determined based on a predefined criterion. The criteria may be an average of the angles and/or a median value of the angles 176a-b corresponding to each of the visual features 172a-b.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, model-based design with auto-code generation, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

A number of implementations have been described. Nevertheless, it will be understood that various modifications may be made without departing from the spirit and scope of the disclosure. Accordingly, other implementations are within the scope of the following claims.

What is claimed is:

1. A method for determining a trailer angle between a tow vehicle and a trailer attached to the tow vehicle, the method comprising:
receiving, at a data processing hardware, images from a camera positioned on a rear portion of the tow vehicle;
determining, at the data processing hardware, visual features from the images;
tracking, at the data processing hardware, the visual features while the tow vehicle and trailer are moving;
calculating, at the data processing hardware, the trailer angle based on the visual features; and
transmitting, from the data processing hardware to one or more vehicle systems in communication with the data processing hardware, the trailer angle,
wherein determining the visual features from the images further comprises selecting features from the images that are substantially in a common plane, and wherein determining the visual features from the images further comprises at least one of
selecting a common plane that have a predefined number feature matches, or
grouping visual features according to a spatial location in the image and selecting one group of visual features based on a calculated probability that the grouping is within a common plane.

2. The method as recited in claim 1, further comprising determining a zero angle while the tow vehicle and trailer are moving straight.

3. The method as recited in claim 1, further comprising determining, at the data processing hardware, that the tow vehicle and trailer are moving straight based on information indicative of tow vehicle operation.

4. The method as recited in claim 1, wherein determining the visual features from the images comprises selecting a common plane that have the predefined number of feature matches.

5. The method as recited in claim 1, wherein determining the visual features comprises grouping visual features according to the spatial location in the image and selecting the one group of visual features based on the calculated probability that the grouping is within a common plane.

6. The method as recited in claim 1, wherein calculating the trailer angle based on the visual features further comprises performing a projective transformation, at the data processing hardware, between the images of the visual features.

7. The method as recited in claim 6, wherein performing the projective transformation comprises a linear transformation between the selected visual features from one set of images at a first orientation of the camera relative to the trailer and a second set of images at a second orientation of the camera relative to the trailer.

8. The method as recited in claim 7, wherein performing the projective transformation includes extracting a rotation matrix for each common plane.

9. The method as recited in claim 7, further comprising extrapolating the relative rotation of the trailer relative to the tow vehicle to a rotation corresponding with a hitch point between the tow vehicle and the trailer.

10. A system for determining a trailer angle between a tow vehicle and a trailer attached to the vehicle, the system comprising:
a data processing hardware device configured to receive images from a camera positioned on a rear portion of the tow vehicle;
determine visual features from the images;
track the visual features while the tow vehicle and trailer is moving;
calculate the trailer angle based on the visual features; and
transmit to one or more vehicle systems in communication with the data processing hardware, the trailer angle,
wherein the data processing hardware is configured to perform a projective transformation calculation on a first image including the selected visual features and on a second image of the selected visual features at a different location and calculating an angle between the tow vehicle and the trailer based on an angle between the projective transformation calculation of the first image and the second image.

11. The system as recited in claim 10, wherein the data processing hardware device is configured to determine a zero angle between the tow vehicle and the trailer while the tow vehicle and trailer are moving straight.

12. The system as recited in claim 11, wherein the data processing hardware device is configured to receive information from sensors gathering information on operation of the two vehicle and determine that the tow vehicle and trailer are at the zero angle, at least partially, based on the sensors providing information indicated that the tow vehicle is moving straight.

13. The system as recited in claim 10, wherein the data processing hardware device is configured to select visual features from the images that are disposed within a substantially common plane.

14. The system as recited in claim 10, wherein the projective transformation performed extracts a rotation matrix for each common plane.

15. The system as recited in claim 10, further comprising a camera mounted to an aft structure of the tow vehicle.

16. The system as recited in claim 15, further comprising at least one sensor disposed within the tow vehicle communicating information indicative of an orientation of the tow vehicle to the data processing hardware.

17. A non-transitory computer readable medium including instructions executable by a data processing hardware, the instructions comprising:
instructions executed by the data processing hardware for receiving images of a trailer from a camera positioned on a rear portion of a tow vehicle;
instructions executed by the data processing hardware for determining visual features from the images;
instructions executed by the data processing hardware for tracking the visual features while the tow vehicle and trailer is moving;
instructions executed by the data processing hardware for calculating the trailer angle based on the visual features;
instructions executed by the data processing hardware for transmitting to one or more vehicle systems in communication with the data processing hardware, the trailer angle; and
instructions executed by the ta processing hardware for performing a projective transformation calculation including ear transformation between selected visual features from one set of images at a first orientation of the camera relative to the trailer and a second set of images at a second orientation of the camera relative to the trailer.

18. A method for determining a trailer angle between a tow vehicle and a trailer attached to the tow vehicle, the method comprising:
receiving, at a data processing hardware, images from a camera positioned on a rear portion of the tow vehicle;
determining, at the data processing hardware, visual features from the images;
tracking, at the data processing hardware, the visual features while the tow vehicle and trailer are moving;
calculating, at the data processing hardware, the trailer angle based on the visual features; and
transmitting, from the data processing hardware to one or more vehicle systems in communication with the data processing hardware, the trailer angle,
wherein calculating the trailer angle based on the visual features comprises performing a projective transformation, at the data processing hardware, between the images of the visual features, and
wherein performing the projective transformation comprises a linear transformation between the selected visual features from one set of images at a first orientation of the camera relative to the trailer and a second set of images at a second orientation of the camera relative to the trailer.

19. The method as recited in claim 18, wherein performing the projective transformation includes extracting a rotation matrix for each common plane.

20. The method as recited in claim 18, further comprising extrapolating a relative rotation of the trailer relative to the tow vehicle to a rotation corresponding with a hitch point between the tow vehicle and the trailer.

21. The system as recited in claim 10, wherein the data processing hardware determines the visual features from the images by at least one of
- selecting a common plane that have a predefined number of feature matches, or
- grouping visual features according to a spatial location in the image and selecting a group of visual features based on a calculated probability that the group is within a common plane.

* * * * *